US009660734B2

(12) United States Patent
Hsu (10) Patent No.: US 9,660,734 B2
(45) Date of Patent: May 23, 2017

(54) METHOD, APPARATUS, AND SYSTEM TO MITIGATE BROADBAND RADIO FREQUENCY INTERFERENCE

(71) Applicant: Intel Corporation, Santa Clara, CA (US)

(72) Inventor: Hao-Han Hsu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 153 days.

(21) Appl. No.: 13/833,826

(22) Filed: Mar. 15, 2013

(65) Prior Publication Data

US 2014/0273860 A1    Sep. 18, 2014

(51) Int. Cl.
*H04B 15/00* (2006.01)
*H04L 25/08* (2006.01)

(52) U.S. Cl.
CPC ............ *H04B 15/00* (2013.01); *H04L 25/08* (2013.01); *H04B 2215/00* (2013.01)

(58) Field of Classification Search
CPC combination set(s) only.
See application file for complete search history.

(56) References Cited

U.S. PATENT DOCUMENTS

| 5,686,872 | A | 11/1997 | Fried et al. | |
| 5,835,535 | A | 11/1998 | Patel et al. | |
| 6,856,165 | B2 * | 2/2005 | Rall | 326/30 |
| 2014/0091874 | A1 * | 4/2014 | Cook et al. | 333/12 |
| 2014/0185249 | A1 * | 7/2014 | Chien | H05K 5/0278 |
| | | | | 361/736 |

FOREIGN PATENT DOCUMENTS

| CN | 201590757 U | 9/2010 |
| CN | 201947167 U | 8/2011 |
| JP | 3163895 U | 10/2010 |
| WO | WO 2007/013052 A1 | 2/2007 |

OTHER PUBLICATIONS

Extended European Search Report in Application No. 14159280.8, mailed on May 30, 2014, 6 pages.
Notice of Preliminary Rejection in Korean Application No. 10-2014-0030319, mailed Dec. 1, 2014 (English translation), 6 pages.
Intel Corporation, "USB 3.0* Radio Frequency Interference Impact on 2.4 GHz Wireless Devices", Document: 327216-001, White Paper, Apr. 2012, 22 pages. Web page available at: http://www.usb.org/developers/whitepapers/327216.pdf.
Nonfinal Notice of Reasons for Rejection in Japanese Application No. 2014-045104, mailed on Mar. 10, 2015, 2 pages of English translation, 1 page of Rejection.
Final Notice of Reasons for Rejection in JP Application No. 2014-045104, mailed on Jun. 16, 2015, English translation, 1 page.
First Office Action in CN Application No. 201410093977.2, mailed on Sep. 25, 2015, no English translation, 7 pages.
Second Office Action in CN Application No. 201410093977.2, mailed on Apr. 29, 2016, no English translation, 3 pages.

* cited by examiner

*Primary Examiner* — Junpeng Chen
(74) *Attorney, Agent, or Firm* — Patent Capital Group (57) ABSTRACT

A radio frequency interference (RFI) mitigation module is provided that is coupled to a high speed data link. The RFI mitigation module is to reduce RFI caused by the high speed data link. The RFI mitigation module includes at least one resister, at least one inductor, and at least one capacitor.

23 Claims, 9 Drawing Sheets

METHOD, APPARATUS, AND SYSTEM TO MITIGATE BROADBAND RADIO FREQUENCY INTERFERENCE

FIELD

This disclosure pertains to computing system, and in particular (but not exclusively) to mitigation of broadband radio frequency interference.

BACKGROUND

As electronic apparatuses become more complex and ubiquitous in the everyday lives of users, more and more diverse requirements are placed upon them. To satisfy many of these requirements, many electronic apparatuses comprise many different devices, such as a CPU, a communication device, a graphics accelerator, etc. In many circumstances, there may be a large amount of communication between these devices. Furthermore, many users have high expectations regarding apparatus performance. Users are becoming less tolerant of waiting for operations to be performed by their apparatuses. In addition, many apparatuses are performing increasingly complex and burdensome tasks that may involve a large amount of inter-device communication. Therefore, there may be some communication between these devices that would cause radio frequency interference and thus affect the performance of some devices.

BRIEF DESCRIPTION OF THE DRAWINGS

Embodiments are illustrated by way of example and not by way of limitation in the FIGURES of the accompanying drawings, in which like references indicate similar elements and in which.

DETAILED DESCRIPTION

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

Although the following embodiments may be described with reference to radio frequency interference (RFI) mitigation in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. As will become readily apparent in the description below, the embodiments of methods, apparatus', and systems described herein (whether in reference to hardware, firmware, software, or a combination thereof) are vital to a future balanced with performance considerations.

Figure 1:
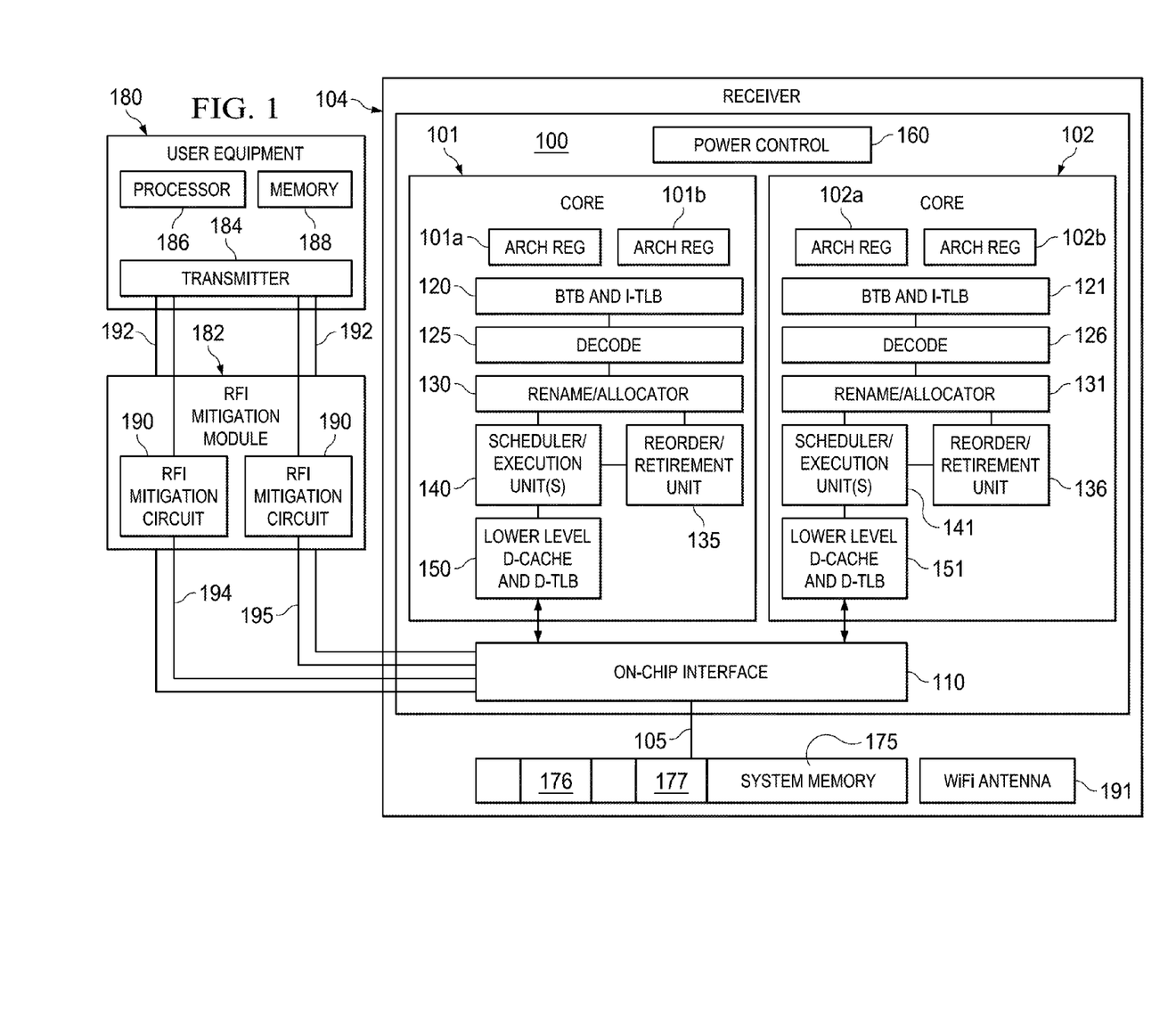
FIG. 1 illustrates an embodiment of a block diagram for a computing system including a multicore processor.

FIG. 1 is a block diagram illustrating components associated with RFI mitigation according to at least one example embodiment. The examples of FIG. 1 are merely examples of components associated with RFI mitigation, and do not limit the scope of the claims. For example, operations attributed to a component may vary, number of components may vary, composition of a component may vary, and/or the like. For example, in some example embodiments, operations attributable to one component of the example of FIG. 1 may be allocated to one or more other components.

Processor 100 includes any processor or processing device, such as a microprocessor, an embedded processor, a digital signal processor (DSP), a network processor, a handheld processor, an application processor, a co-processor, a system on a chip (SOC), or other device to execute code. Processor 100, in one embodiment, includes at least two cores—core 101 and 102, which may include asymmetric cores or symmetric cores (the illustrated embodiment). However, processor 100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores—core 101 and 102. Here, core 101 and 102 are considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 101 are described in further detail below, as the units in core 102 operate in a similar manner in the depicted embodiment.

As depicted, core 101 includes two hardware threads 101a and 101b, which may also be referred to as hardware thread slots 101a and 101b. Therefore, software entities, such as an operating system, in one embodiment potentially view processor 100 as four separate processors, i.e., four logical processors or processing elements capable of executing four software threads concurrently. As alluded to above, a first thread is associated with architecture state registers 101a, a second thread is associated with architecture state registers 101b, a third thread may be associated with architecture state registers 102a, and a fourth thread may be associated with architecture state registers 102b. Here, each of the architecture state registers (101a, 101b, 102a, and 102b) may be referred to as processing elements, thread slots, or thread units, as described above. As illustrated, architecture state registers 101a are replicated in architecture state registers 101b, so individual architecture states/contexts are capable of being stored for logical processor 101a and logical processor 101b. In core 101, other smaller resources, such as instruction pointers and renaming logic in allocator and renamer block 130 may also be replicated for threads 101a and 101b. Some resources, such as re-order buffers in reorder/retirement unit 135, branch target buffer (BTB) and instruction-translation buffer (I-TLB) 120, load/store buffers, and queues may be shared through partitioning. Other resources, such as general purpose internal registers, page-table base register(s), low-level data-cache and data-TLB 150, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a BTB and I-TLB 120 to predict branches to be executed/taken and a BTB and I-TLB 120 to store address translation entries for instructions.

Core 101 further includes decode module 125 coupled to BTB and I-TLB 120 to decode fetched elements. Fetch logic, in one embodiment, includes individual sequencers associated with thread slots 101a, 101b, respectively. Usually core 101 is associated with a first ISA, which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 125, in one embodiment, recognize the same ISA (or a subset thereof). Alternatively, in a heterogeneous core environment, decoders 125 recognize a second ISA (either a subset of the first ISA or a distinct ISA).

In one example, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache, such as a second level cache associated with on-chip interface module 110. Note that higher-level or further-out refers to cache levels increasing or getting further way from the execution unit(s). In one embodiment, higher-level cache is a last-level data cache—last cache in the memory hierarchy on processor 100—such as a second or third level data cache. However, higher level cache is not so limited, as it may be associated with or include an instruction cache. A trace cache—a type of instruction cache—instead may be coupled after decoder 125 to store recently decoded traces. Here, an instruction potentially refers to a macro-instruction (i.e. a general instruction recognized by the decoders), which may decode into a number of micro-instructions (micro-operations).

In the depicted configuration, processor 100 also includes on-chip interface module 110. Historically, a memory controller, which is described in more detail below, has been included in a computing system external to processor 100. In this scenario, on-chip interface module 110 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this scenario, bus 105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 175 may be dedicated to processor 100 or shared with other devices in a system. Common examples of types of memory 175 include DRAM, SRAM, non-volatile memory (NV memory), and other known storage devices. Note that device 180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 100. For example in one embodiment, a memory controller hub is on the same package and/or die with processor 100. Here, a portion of the core (an on-core portion) 110 includes one or more controller(s) for interfacing with other devices such as memory 175 or a device 180. The configuration including an interconnect and controllers for interfacing with such devices is often referred to as an on-core (or un-core configuration). As an example, on-chip interface 110 includes a ring interconnect for on-chip communication and a high-speed serial point-to-point link 105 for off-chip communication. Yet, in the SOC environment, even more devices, such as the network interface, co-processors, memory 175, device 180, and any other known computer devices/interface may be integrated on a single die or integrated circuit to provide small form factor with high functionality and low power consumption.

In one embodiment, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

On-chip interface module 110 may be connected to user equipment 180 through data link 192. Data link 192 may be a universal serial bus (USB), PCIe, mobile industry processor interface (MIPI®), Thunderbolt, SSIC, Display Port, or some other similar high speed data link. User equipment 180 can include a transmitter 184, a processor 186, and memory 188. Transmitter 184 can send data to receiver 104 using RFI mitigation module 182. RFI mitigation module 182 can include one or more RFI mitigation circuit(s) 190.

High-speed data links have become very important and attractive functions on computer platforms as the links can significantly shorten the duration of data transmission and enhances user experiences. USB 3.0 (USB3) and PCIe are two of the most widely-accepted high-speed interfaces.

However, some high speed data links can cause RFI. In an example, USB3 has a relatively broad-band noise signature across 5 GHz and as this broad-band noise radiates, it can be received by radio antennas such as WiFi antenna 191 and other radios, e.g., cellular radios, 2G, 3G, LTE, WiMax, GNSS, etc. With a USB3 device (e.g., user equipment 180) acting as a transmitter and/or receiver connected to the platform (receiver 104) also acting as a transmitter and/or receiver, WiFi antenna 191 may suffer from additional 15 dB in-band noise which may be enough to cause radio and wireless peripherals to stop working. One of the conventional approaches to reduce this interference is to enhance the connector and cable shielding, however, this approach may significantly increase the billing of material (BoM) cost and additional validation/regulation may be required for connectors and cables.

To reduce the RFI caused by broad-band noise, a network composed of multiple transmission lines and lumped elements (e.g., RFI mitigation module 182) may enable RFI suppression for broadband signals. Two identical networks composed of transmission lines and an electrical circuit including resistor, inductor, and capacitor (RLC) elements (e.g., FRI mitigation circuit 190) may be inserted between transmitter 184 and receiver 104. In an embodiment, RFI mitigation module 182 may be as close to transmitter 184 as possible to ensure good RFI reduction. Such a network may reduce WiFi interference by about 15 dB without compromising signal integrity (SI) performance. In addition, the network may be readily generalized to other radio bands by configuring transmission-line lengths and lumped-element values. Such a network may relax the stringent shielding requirements on high-speed interfaces and enhance radio performance in the presence of high-speed links.

Figure 2:
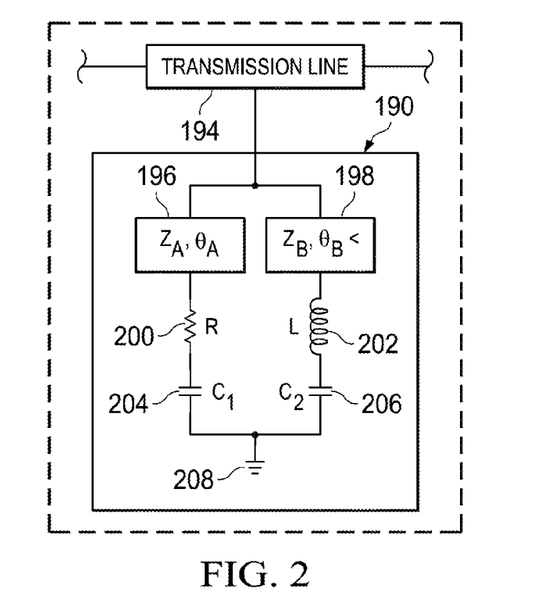
FIG. 2 illustrates an embodiment of a circuit diagram according to at least one embodiment.

Turning to FIG. 2, FIG. 2 illustrates an example RFI mitigation circuit 190. In this example, RFI mitigation circuit is connected to transmission line 194. RFI mitigation circuit 190 includes a first segment 196, a second segment 198, a resistor 200 (e.g., 30 ohm), an inductor 202 (e.g., 10 nH), a first capacitor 204 (e.g., 100 nF), a second capacitor 206 (e.g., 400 fF), and a ground 208. First line segment 196 has an impedance ZA (e.g., 150 ohm) and a phase angle θA (e.g., 70 degree). Second line segment 198 has a different impedance ZB (e.g., 50 ohm) and a different phase angle θB (e.g., 85 degree). In a specific embodiment, first segment 196 is roughly a quarter-wavelength (e.g., about 8 mm), while second segment 198 is typically shorter than a quarter-wavelength (e.g., VALUE?). The RFI-reduction band can be determined by the combination of the phase angel (e.g., θB), inductor 202, and second capacitor 206. In an embodiment, first capacitor 204 may have a relatively larger capacitance than second capacitor 206 (e.g., an example value may be about 100 nF for first capacitor 204 and VALUE for second capacitor 206).

Figure 3:
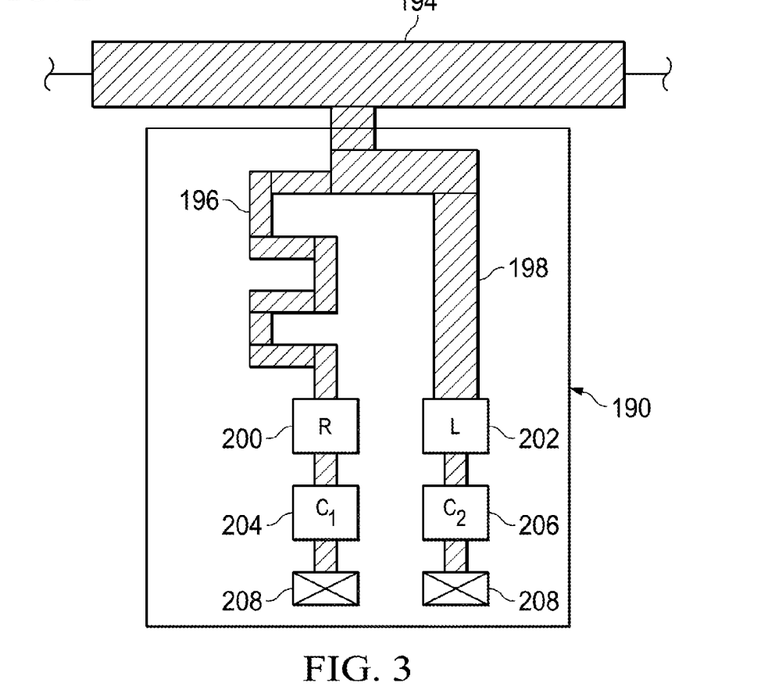
FIG. 3 illustrates an embodiment of a block diagram according to at least one embodiment.

Turning to FIG. 3, FIG. 3 illustrates an example RFI mitigation circuit 190. In a specific embodiment, first segment 196 is roughly a quarter-wavelength (e.g., about 8 mm), while second segment 198 is typically shorter than quarter-wavelength. Such a configuration allows first line segment 196 to have an impedance ZA and a phase angle θA and second line segment 198 to have a different impedance ZB and a different phase angle θB. Besides surface mounted components, the elements of RFI mitigation circuit 190 may also be realized using metal traces and dielectric on PCB boards.

Figure 4A:
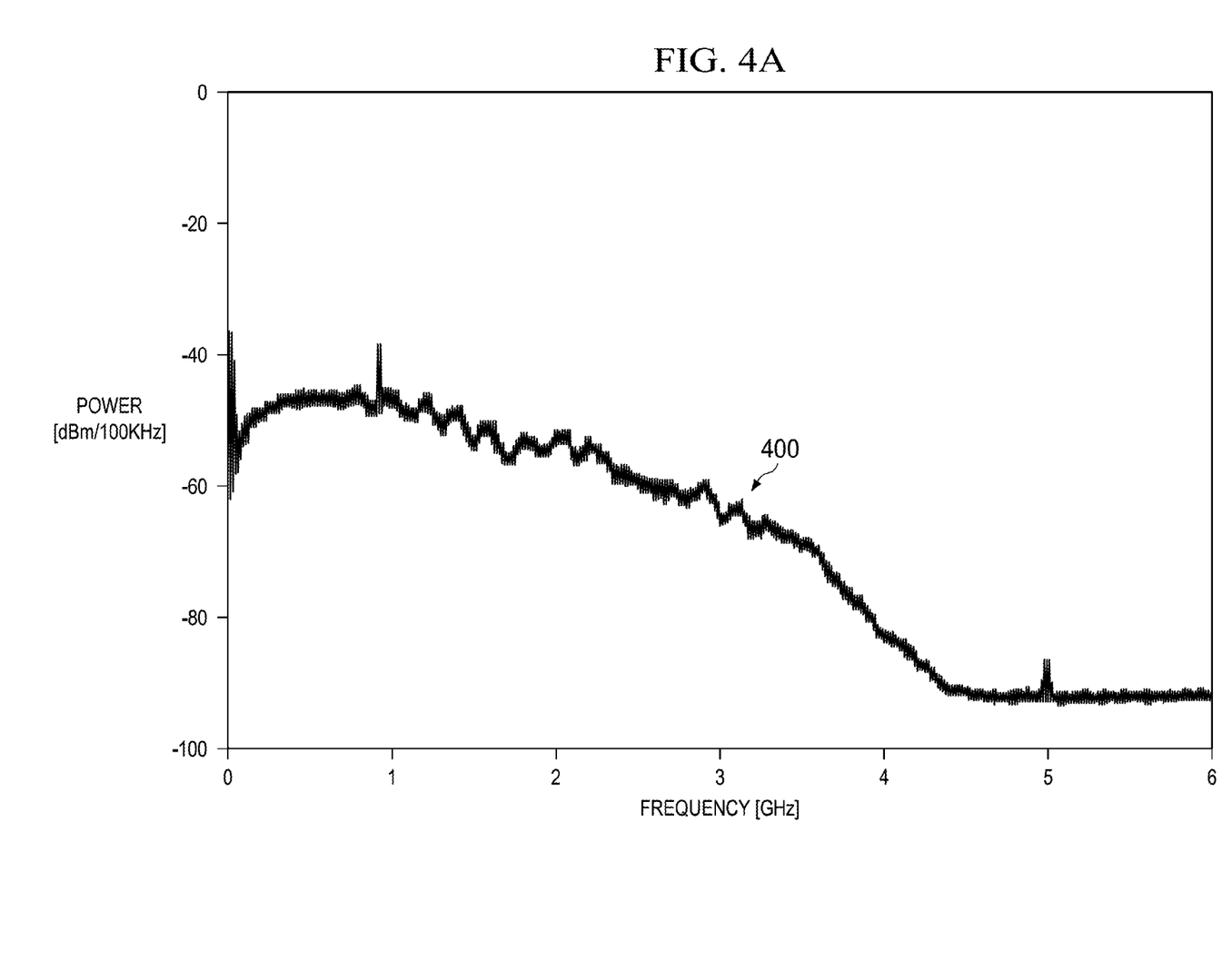
FIG. 4A illustrates an embodiment of a graph according to at least one embodiment.
Figure 4B:
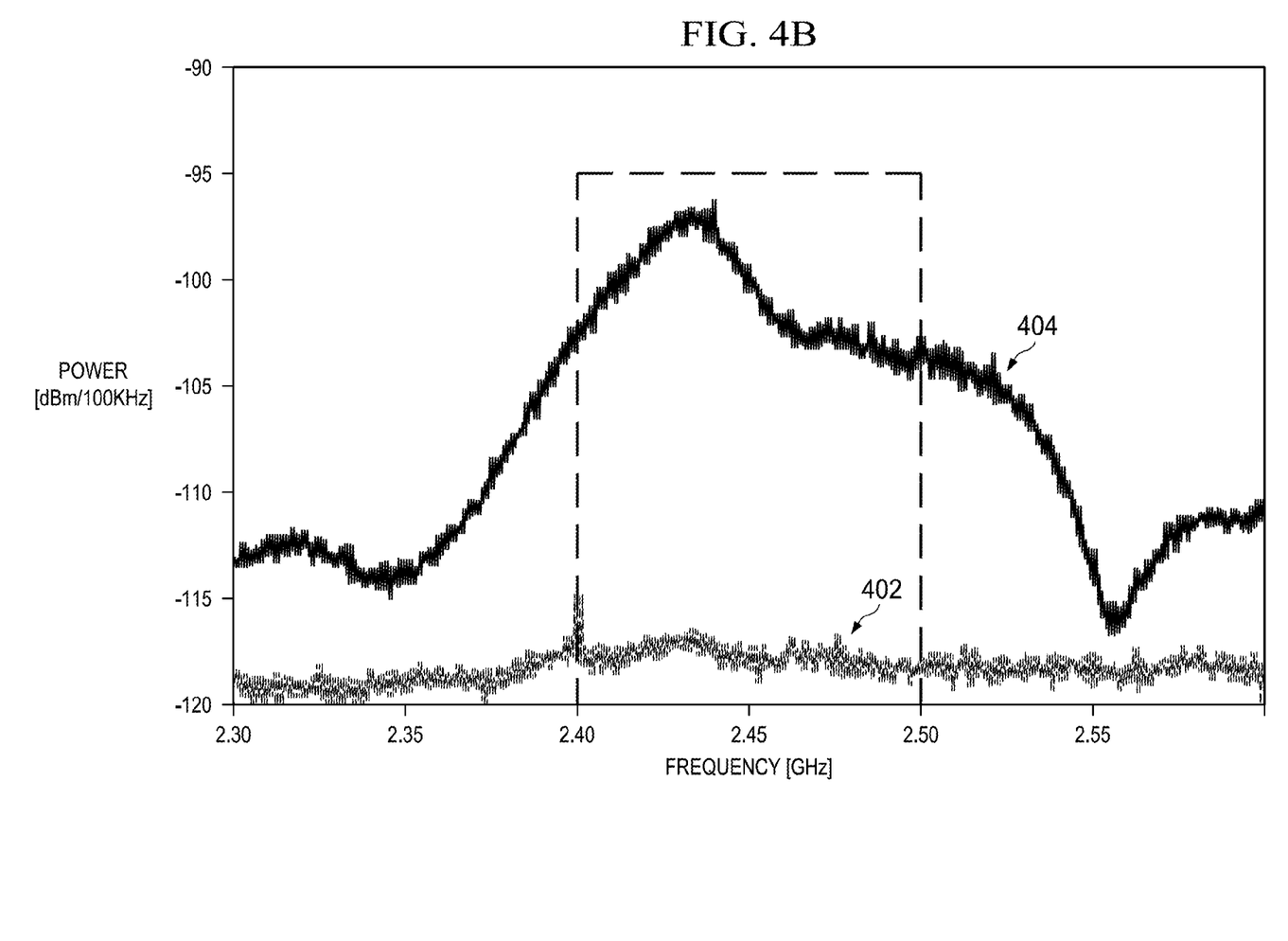
FIG. 4B illustrates an embodiment of a graph according to at least one embodiment.
Figure 5:
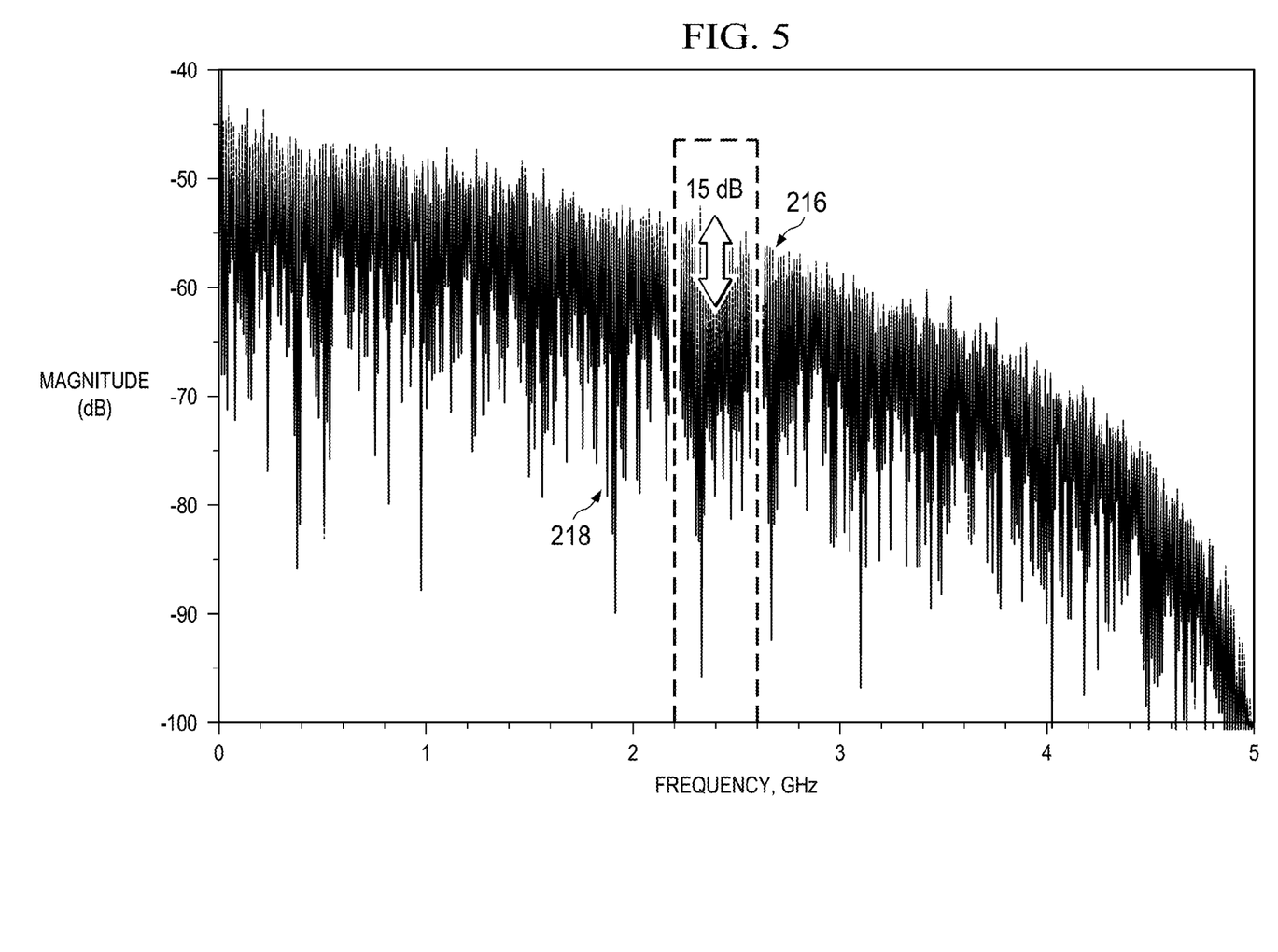
FIG. 5 illustrates an embodiment of a graph according to at least one embodiment.

Turning to FIG. 4A, FIG. 4A is a typical spectrum of a USB3 transmission with broad-band noise from direct current (dc) to about 5 GHz. Turning to FIG. 4B, FIG. 4B includes a typical WiFi antenna noise profile 402 and an interfered WiFi antenna noise profile 404. The interference shown in interfered WiFi antenna noise profile 404 may be from a USB3 transmission or some other high speed data transmission. As shown, the interference introduces additional fifteen (15)-dB of in-band noise in the frequency range of about 2.4 GHz to about 2.5 GHz. To reduce the interference, RFI mitigation module 182 may be used in the high speed data transmission line. Turning to FIG. 5, FIG. 5 illustrates an USB3 broad-band noise 216 and a RFI mitigated noise 218. As shown, the broad-band noise in WiFi band is about 15 dB less.

Figure 6A:
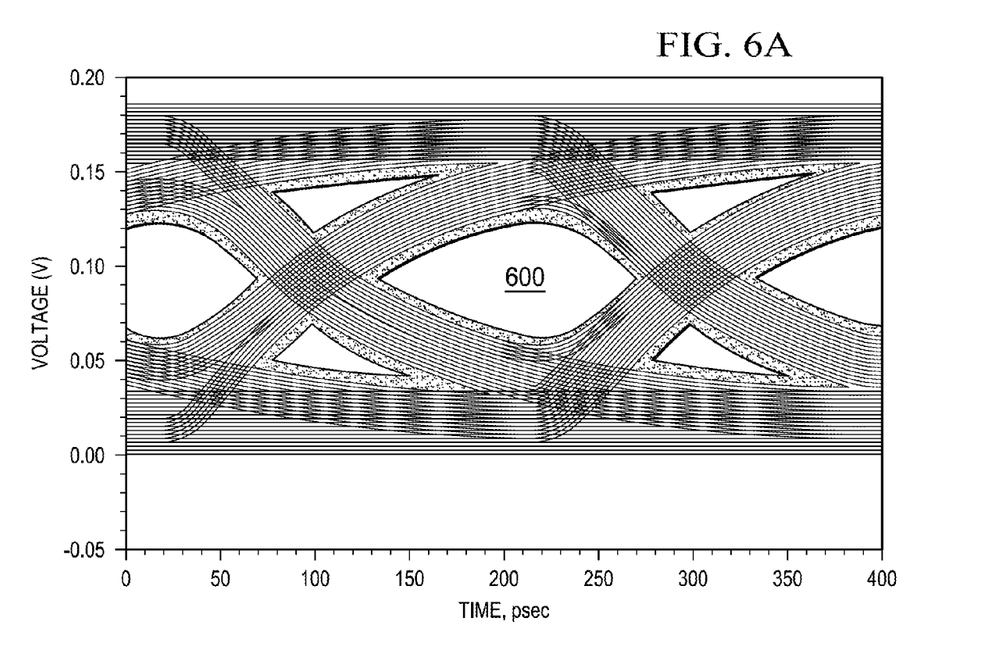
FIG. 6A-6C illustrate an embodiment of eye graphs according to at least one embodiment.
Figure 6B:
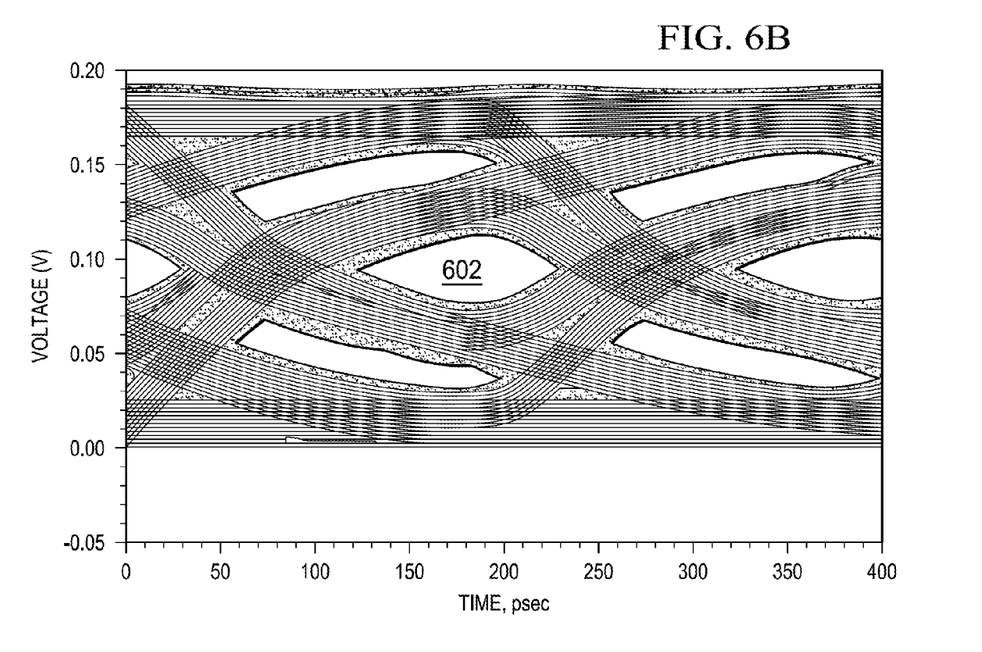
Figure 6C:
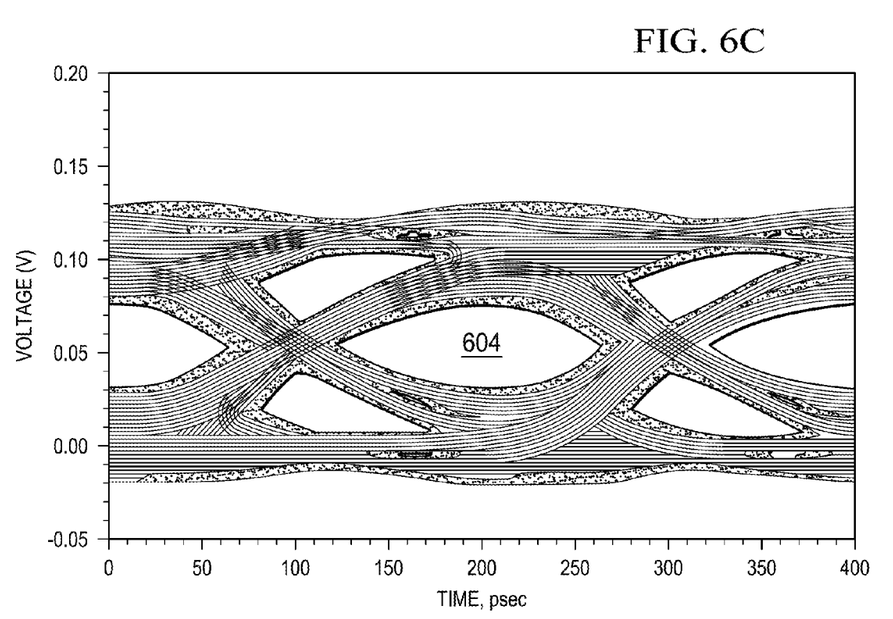

Turning to FIG. 6A, FIG. 6A illustrates an eye diagram of a WiFi channel without any high speed data interference. As shown, an eye 600 is relatively well defined with a good height and width. Turning to FIG. 6B, FIG. 6B illustrates an eye diagram when LC notch filters (L and C2 only) are connected to the WiFi channel in an attempt to reduce high speed data interference. As shown, an eye 602 is not relatively well defined and the eye height and width are degraded (e.g., in one specific example, the degradation may be as much as 47% and 22% respectively) due to the signal integrity (SI) penalty from the LC notch filter. Turning to FIG. 6C, FIG. 6C illustrates an eye diagram when RFI mitigation module 182 is used in the data flow. As shown, an eye 604 is relatively well defined with a good height and width. Eye 604 appears similar to eye 600 shown in FIG. 6A because RFI mitigation module 182 is able to effectively reduce RFI in the radio bands but the SI penalty is negligible.

Figure 7:
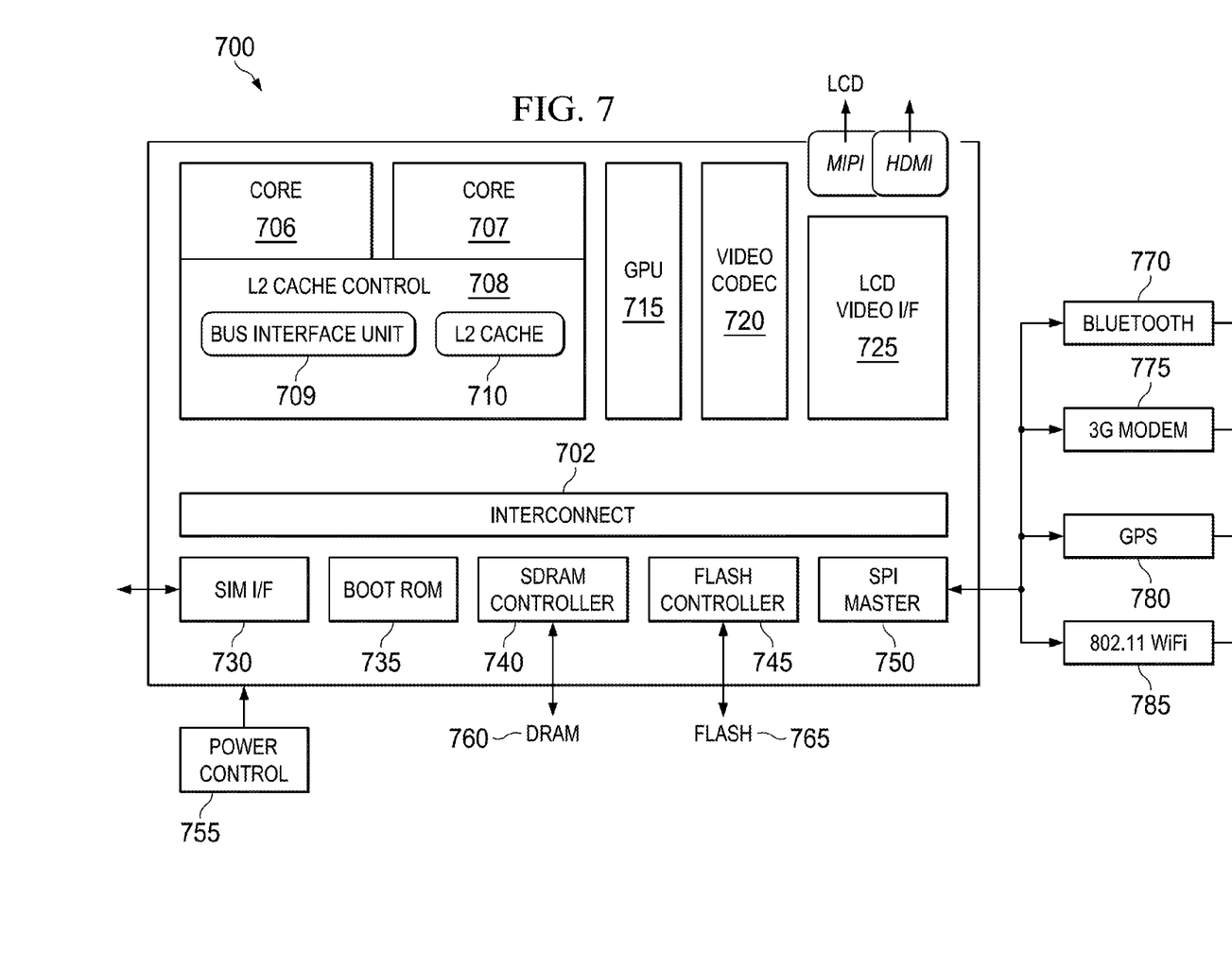
FIG. 7 illustrates an embodiment of a block diagram associated with an ARM ecosystem system on chip (SOC) according to at least one embodiment.

FIG. 7 is a simplified block diagram associated with an example ARM ecosystem SOC 700 of the present disclosure. At least one example implementation of the present disclosure includes an integration of the RFI mitigation features discussed herein and an ARM component. More specifically, RFI mitigation module 182 may be included in chip-to chip connections (e.g., SuperSpeed Inter-Chip (SSIC), MIPI, etc.), external input/output connections (e.g., USB, Thunderbolt, etc.), graphics signals (e.g., High-Definition Multimedia Interface (HDMI), Display Port, embedded display port (eDP), etc.). For example, the example of FIG. 7 can be associated with any ARM core (e.g., A-9, A-15, etc.). Further, the architecture can be part of any type of tablet, smartphone (inclusive of Android™ phones, i-Phones™), i-Pad™, Google Nexus™, Microsoft Surface™, personal computer, server, video processing components, laptop computer (inclusive of any type of notebook), any type of touch-enabled input device, etc.

In this example of FIG. 7, ARM ecosystem SOC 700 may include multiple cores 706-707, an L2 cache control 708, a bus interface unit 709, an L2 cache 710, a graphics processing unit (GPU) 715, an interconnect 702, a video codec 720, and a liquid crystal display (LCD) I/F 725, which may be associated with mobile industry processor interface (MIPI)/high-definition multimedia interface (HDMI) links that couple to an LDC.

ARM ecosystem SOC 700 may also include a subscriber identity module (SIM) I/F 730, a boot read-only memory (ROM) 735, a synchronous dynamic random access memory (SDRAM) controller 740, a flash controller 745, a serial peripheral interface (SPI) master 750, a suitable power control 755, a dynamic RAM (DRAM) 760, and flash 765. In addition, one or more example embodiment include one or more communication capabilities, interfaces, and features such as instances of Bluetooth 770, a 3G modem 775, a global positioning system (GPS) 780, and an 802.11 WiFi 685.

In operation, the example of FIG. 7 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe® Flash® Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache.

Figure 8:
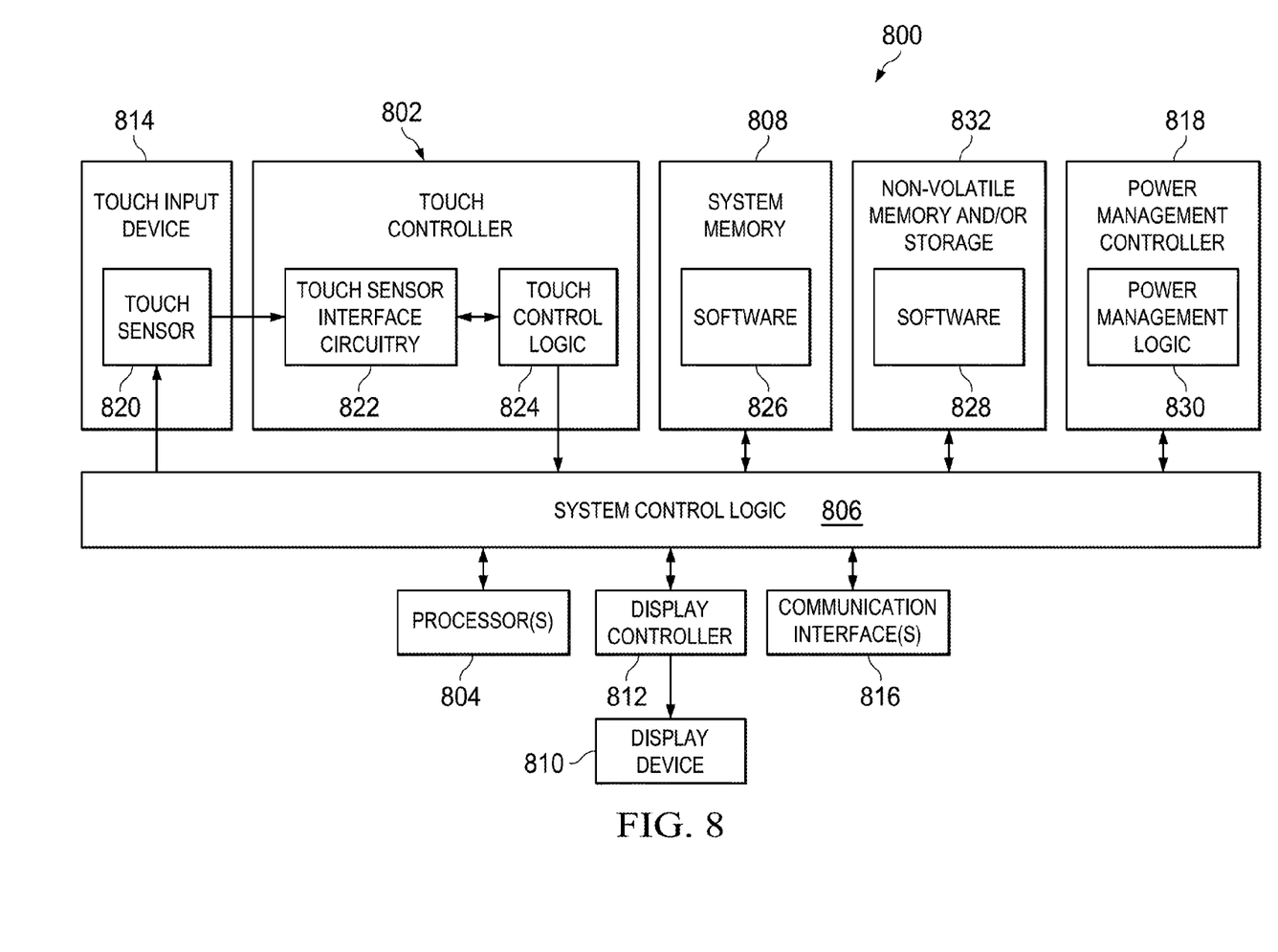
FIG. 8 illustrates an embodiment of a block diagram illustrating example logic that may be used to execute activities according to at least one embodiment.

FIG. 8 is a simplified block diagram illustrating potential electronics and logic that may be associated with any of the RFI mitigation operations discussed herein. In at least one example embodiment, system 800 includes a touch controller 802, one or more processors 804, system control logic 806 coupled to at least one of processor(s) 804, system memory 808 coupled to system control logic 806, non-volatile memory and/or storage device(s) 810 coupled to system control logic 806, display controller 812 coupled to system control logic 806, display controller 812 coupled to a display, power management controller 818 coupled to system control logic 806, and/or communication interfaces 816 coupled to system control logic 806.

System control logic 806, in at least one embodiment, includes any suitable interface controllers to provide for any suitable interface to at least one processor 804 and/or to any suitable device or component in communication with system control logic 806. System control logic 806, in at least one example embodiment, includes one or more memory controllers to provide an interface to system memory 808. System memory 808 may be used to load and store data and/or instructions, for example, for system 800. System memory 808, in at least one example embodiment, includes any suitable volatile memory, such as suitable dynamic random access memory (DRAM) for example. System control logic 806, in at least one example embodiment, includes one or more input/output (I/O) controllers to provide an interface to a display device, touch controller 802, and non-volatile memory and/or storage device(s) 810.

Non-volatile memory and/or storage device(s) 810 may be used to store data and/or instructions, for example within software 828. Non-volatile memory and/or storage device(s) 810 may include any suitable non-volatile memory, such as flash memory for example, and/or may include any suitable non-volatile storage device(s), such as one or more hard disc drives (HDDs), one or more compact disc (CD) drives, and/or one or more digital versatile disc (DVD) drives for example.

Power management controller 818 may include power management logic 830 configured to control various RFI mitigation functions disclosed herein or any part thereof. In at least one example embodiment, power management controller 818 is configured to reduce the power consumption of components or devices of system 800 that may either be operated at reduced power or turned off when the electronic device is in the closed configuration. For example, in at least one example embodiment, when the electronic device is in a closed configuration, power management controller 818 performs one or more of the following: power down the unused portion of a display and/or any backlight associated therewith; allow one or more of processor(s) 804 to go to a lower power state if less computing power is required in the closed configuration; and shutdown any devices and/or components, such as a keyboard, that are unused when an electronic device is in the closed configuration.

Communications interface(s) 820 may provide an interface for system 800 to communicate over one or more networks and/or with any other suitable device. Communications interface(s) 820 may include any suitable hardware and/or firmware. Communications interface(s) 820, in at least one example embodiment, may include, for example, a network adapter, a wireless network adapter, a telephone modem, and/or a wireless modem.

System control logic 806, in at least one example embodiment, includes one or more input/output (I/O) controllers to provide an interface to any suitable input/output device(s) such as, for example, an audio device to help convert sound into corresponding digital signals and/or to help convert digital signals into corresponding sound, a camera, a camcorder, a printer, and/or a scanner.

For at least one example embodiment, at least one processor 804 may be packaged together with logic for one or more controllers of system control logic 806. In at least one example embodiment, at least one processor 804 may be packaged together with logic for one or more controllers of system control logic 806 to form a System in Package (SiP). In at least one example embodiment, at least one processor 804 may be integrated on the same die with logic for one or more controllers of system control logic 806. For at least one example embodiment, at least one processor 804 may be integrated on the same die with logic for one or more controllers of system control logic 806 to form a System on Chip (SoC).

For touch control, touch controller 802 may include touch sensor interface circuitry 822 and touch control logic 824. Touch sensor interface circuitry 822 may be coupled to detect touch input over a first touch surface layer and a second touch surface layer of a display (i.e., display device 810). Touch sensor interface circuitry 822 may include any suitable circuitry that may depend, for example, at least in part on the touch-sensitive technology used for a touch input device. Touch sensor interface circuitry 822, in one embodiment, may support any suitable multi-touch technology. Touch sensor interface circuitry 822, in at least one embodiment, includes any suitable circuitry to convert analog signals corresponding to a first touch surface layer and a second surface layer into any suitable digital touch input data. Suitable digital touch input data for one embodiment may include, for example, touch location or coordinate data.

Touch control logic 824 may be coupled to help control touch sensor interface circuitry 822 in any suitable manner to detect touch input over a first touch surface layer and a second touch surface layer. Touch control logic 824 for at least one example embodiment may also be coupled to output in any suitable manner digital touch input data corresponding to touch input detected by touch sensor interface circuitry 822. Touch control logic 824 may be implemented using any suitable logic, including any suitable hardware, firmware, and/or software logic (e.g., non-transitory tangible media), that may depend, for example, at least in part on the circuitry used for touch sensor interface circuitry 822. Touch control logic 824 for one embodiment may support any suitable multi-touch technology.

Touch control logic 824 may be coupled to output digital touch input data to system control logic 806 and/or at least one processor 804 for processing. At least one processor 804 for one embodiment may execute any suitable software to process digital touch input data output from touch control logic 824. Suitable software may include, for example, any suitable driver software and/or any suitable application software. As illustrated in FIG. 8, system memory 808 may store suitable software 826 and/or non-volatile memory and/or storage device(s).

Note that the apparatus', methods', and systems described above may be implemented in any electronic device or system as aforementioned. As specific illustrations, the figures below provide exemplary systems for utilizing the invention as described herein. As the systems below are described in more detail, a number of different interconnects are disclosed, described, and revisited from the discussion above. And as is readily apparent, the advances described above may be applied to any of those interconnects, fabrics, or architectures.

While the present invention has been described with respect to a limited number of embodiments, those skilled in the art will appreciate numerous modifications and variations therefrom. It is intended that the appended claims cover all such modifications and variations as fall within the true spirit and scope of this present invention.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc, which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

The following examples pertain to embodiments in accordance with this Specification. One or more embodiments may provide an apparatus, a system, a machine readable storage, a machine readable medium, and a method to connect a first end of a high speed data link to a transmitter; and connect a second end of the high speed data link to a receiver to connect the transmitter and receiver over a path comprising a radio frequency interference (RFI) mitigation module to mitigate RFI caused by the high speed data link, wherein the RFI mitigation module includes: at least one resister; at least one inductor; and at least one capacitor.

In at least one example, the high speed data link is a universal serial bus (USB) 3.0 data link.

One or more examples can further provide user equipment wherein the user equipment includes a transmitter and the transmitter is connected to a first end of the high speed data link; and a receiver, wherein the receiver is connected to a second end of the high speed data link.

In at least one example, the RFI mitigation module is located on the first end of the high speed data link.

In at least one example, the RFI mitigation module includes a RFI mitigation circuit connected to a transmission line of the high speed data link.

In at least one example, the mitigation circuit includes a first segment having a first impedance and a first phase angle; and a second segment having a second impedance and a second phase angle.

In at least one example, the first segment has a length that approximates a quarter of a reference wavelength, wherein the reference wavelength contributes to the RFI.

In at least one example, the second segment is shorter than first segment.

In at least one example, the RFI mitigation circuit further includes a resistor coupled to the first segment; a first capacitor coupled to the first segment; an inductor coupled to the second segment; and a second capacitor coupled to the second segment.

In at least one example, a first capacitance of the first capacitor is larger than a second capacitance of the second capacitor.

In at least one example, the capacitance of the first capacitor is approximately one hundred nanofarads.

In at least one example, a RFI reduction band for the RFI can be determined by the second phase angle, the inductor, and the second capacitor.

In at least one example, the reference wavelength of a WiFi frequency.

In at least one example, the RFI mitigation module is to reduce the RFI by at least fourteen (14) decibels.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
a particular transmission line for a data link; and
a radio frequency interference (RFI) mitigation module coupled to the particular transmission line, wherein the RFI mitigation module is to reduce RFI caused by the data link and the RFI mitigation module comprises an RFI mitigation circuit and the RFI mitigation circuit comprises:
a first segment connected to the particular transmission line and having a first impedance and a first phase angle, wherein the first segment is a first physical length corresponding to a reference wavelength; and
a second segment connected to the particular transmission line in parallel with the first segment and having a different, second impedance and a different, second phase angle, wherein the second segment is a different, second physical length corresponding to the reference wavelength.

2. The apparatus of claim 1, wherein the data link is a universal serial bus (USB) 3.0 data link.

3. The apparatus of claim 1, further comprising:
user equipment wherein the user equipment includes a transmitter and the transmitter is connected to a first end of the data link; and
a receiver, wherein the receiver is connected to a second end of the data link.

4. The apparatus of claim 3, wherein the RFI mitigation module is located on the first end of the particular transmission line for.

5. The apparatus of claim 1, wherein the first length approximates a quarter of the reference wavelength, wherein the reference wavelength contributes to the RFI.

6. The apparatus of claim 5, wherein the second length is shorter than the first length.

7. The apparatus of claim 1, wherein the RFI mitigation circuit further includes:
   a resistor coupled to the first segment;
   a first capacitor coupled to the first segment;
   an inductor coupled to the second segment; and
   a second capacitor coupled to the second segment.

8. The apparatus of claim 7, wherein a first capacitance of the first capacitor is larger than a second capacitance of the second capacitor.

9. The apparatus of claim 8, wherein the capacitance of the first capacitor is approximately one hundred nanofarads.

10. The apparatus of claim 7, wherein a RFI reduction band for the RFI can be determined by the second phase angle, the inductor, and the second capacitor.

11. The apparatus of claim 1, wherein the reference wavelength is a wavelength of a WiFi frequency.

12. The apparatus of claim 1, wherein the RFI mitigation module is to reduce the RFI by at least fourteen (14) decibels.

13. The apparatus of claim 1, wherein the link comprises a high speed data link operable to transmit data at a speed equal to or greater than 5 Ghz.

14. A method for providing radio frequency interference (RFI) mitigation, comprising:
   connecting a first end of a particular transmission line of a data link to a transmitter; and
   connecting a second end of the particular transmission line of the data link to a receiver to connect the transmitter and receiver over a path, wherein the particular transmission line of the data link is coupled to a radio frequency interference (RFI) mitigation module to mitigate RFI caused by the data link, wherein the RFI mitigation module comprises an RFI mitigation circuit and the RFI mitigation circuit comprises:
      a first segment connected to the particular transmission line and having a first impedance and a first phase angle, wherein the first segment is a first physical length corresponding to a reference wavelength; and
      a second segment connected to the particular transmission line in parallel with the first segment and having a different, second impedance and a different, second phase angle, wherein the second segment is a different, second physical length corresponding to the reference wavelength.

15. The method of claim 14, wherein the data link comprises a universal serial bus (USB) 3.0 data link.

16. The method of claim 14, wherein the RFI mitigation module is located on the first end of the particular transmission line.

17. The method of claim 14, wherein the first length approximates a quarter of the reference wavelength causing the RFI.

18. The method of claim 17, wherein the second length is shorter than the first length.

19. The method of claim 14, wherein the RFI mitigation circuit further includes:
   a resistor coupled to the first segment;
   a first capacitor coupled to the first segment;
   an inductor coupled to the second segment; and
   a second capacitor coupled to the second segment.

20. The method of claim 19, wherein a first capacitance of the first capacitor is larger than a second capacitance of the second capacitor.

21. The method of claim 20, wherein the capacitance of the first capacitor is approximately one hundred nanofarads.

22. The method of claim 14, wherein the RFI mitigation module is to reduce the RFI by at least fourteen (14) decibels.

23. An apparatus for providing radio frequency interference (RFI) mitigation, comprising:
   means for connecting a first end of a data link to a transmitter;
   means for connecting a second end of the data link to a receiver; and
   means for mitigating radio frequency interference (RFI) caused by the data link, wherein the means for mitigating RFI is to be connected to a transmission line of the data link and comprises:
      a first circuit segment connected to the transmission line and having a first impedance and a first phase angle, wherein the first circuit segment is a first physical length corresponding to a reference wavelength; and
      a second circuit segment connected to the transmission line in parallel with the first segment and having a different, second impedance and a different, second phase angle, wherein the second circuit segment is a different, second physical length corresponding to the reference wavelength.

* * * * *